US006757085B1

(12) United States Patent
Halldorsson

(10) Patent No.: US 6,757,085 B1
(45) Date of Patent: Jun. 29, 2004

(54) IMAGE REPRESENTATION SYSTEM AND METHOD FOR VEHICLES

(75) Inventor: Thorsteinn Halldorsson, Munich (DE)

(73) Assignee: Eads Deutschland GmbH, Ottobrunn (DE)

(*) Notice: Subject to any disclaimer, the term of this patent is extended or adjusted under 35 U.S.C. 154(b) by 8 days.

(21) Appl. No.: 10/019,724

(22) PCT Filed: Jun. 28, 2000

(86) PCT No.: PCT/DE00/02115
§ 371 (c)(1),
(2), (4) Date: Apr. 26, 2002

(87) PCT Pub. No.: WO01/02892
PCT Pub. Date: Jan. 11, 2001

(30) Foreign Application Priority Data

Jul. 2, 1999 (DE) .......................... 199 30 710

(51) Int. Cl.$^7$ ................................................ G03H 1/00
(52) U.S. Cl. ........................... 359/13; 359/15; 359/14; 359/24; 359/33; 345/9
(58) Field of Search .......................... 359/13, 14, 15, 359/1, 24, 32, 33, 630, 632; 345/7, 8, 9

(56) References Cited

U.S. PATENT DOCUMENTS 4,832,427 A * 5/1989 Nanba et al. ................. 359/15
5,497,170 A * 3/1996 Kato et al. .................... 345/9
6,198,554 B1 * 3/2001 Kanda et al. ................. 359/28

FOREIGN PATENT DOCUMENTS

| DE | 4445555 | 6/1995 |
| DE | 19700162 | 7/1998 |
| EP | 0151455 | 8/1985 |
| EP | 0450553 | 10/1991 |
| EP | 0479059 | 4/1992 |

OTHER PUBLICATIONS

Copy of the International Search Report.

* cited by examiner

Primary Examiner—Drew A. Dunn
Assistant Examiner—Fayez Assaf
(74) Attorney, Agent, or Firm—Crowell & Moring LLP

(57) ABSTRACT

An imaging system for motor vehicles has a holographic screen, which scatters incident narrow band light at a predetermined solid angle, and a modulator and a lens to project images on the holographic screen. A holographic, transparent ray uniter, which allows broad band ambient light to pass through essentially unimpeded, guides the narrow band light, coming from the holographic screen to the viewer, whereby a virtual image is produced at the viewing location by means of an imaging function. Images from the outside of the motor vehicle are shot by means of a camera system and are faded as virtual images into the windshield of the motor vehicle in order to enable there additionally a view to the rear or to the side.

22 Claims, 2 Drawing Sheets

IMAGE REPRESENTATION SYSTEM AND METHOD FOR VEHICLES

BACKGROUND AND SUMMARY OF THE INVENTION

This application claims the priority of German Patent Document 199 30 910.5, filed Jul. 2, 1999, the disclosure of which is expressly incorporated by reference herein.

The present invention relates to an imaging system for motor vehicles and a method for displaying images in motor vehicles.

It is well-known that the view in the rearward direction to observe the following traffic from a motor vehicle is rendered possible by means of interior and outside mirrors. This applies both to cars, as well as to trucks and busses. The use and simplicity of such rearview and side view mirrors is undisputed. However, they have several limitations and drawbacks, for example, with respect to safety and economical driving.

One drawback of the interior or rearview mirror is the limitation of the view in the direction of the rear due to the rear window or passengers, located in the motor vehicle. Furthermore, the view by means of the left outside mirror is not complete, but rather has a so-called "dead angle", which is frequently the cause of traffic accidents when changing lanes.

Another grave drawback of the rearview and side view mirrors is that for viewing purposes it is necessary to rotate the view to the side by an angle of approximately 30 degrees to 45 degrees. When the driver looks into the mirror, his attention to the view ahead is extremely limited. The reason lies in the fact that the distinct vision decreases very rapidly with the angular distance from the visual axis; and at a viewing angle exceeding 30 degrees only a weak recognition of outlines and shapes without clear distance perception is possible. This is not at all adequate to react quickly to unexpected traffic obstructions or situations on the street.

In addition, when driving in the dark, the reflection from headlights of other motor vehicles is intense in the outside mirrors and the interior rearview mirror. Owing to the blinding effect, this feature is very disturbing and fatigues the driver on long trips. Frequently it is also the cause of accidents.

Since the outside mirrors project beyond the side limits of the motor vehicle body, they can constitute an obstruction or danger for other traffic participants and also be damaged, for example, when driving through very narrow streets or very close to other traffic participants. In addition, the outside mirrors can become rapidly dirty due to their unprotected attachment to the car, thus impairing the view.

Another major drawback of the outside mirrors is their effect on the C value, the result of which is an economic drawback. When driving fast on country roads and freeways, the air resistance of the side mirrors increases the fuel consumption of cars by approximately 5% to 10%. Another disturbing factor is the wind noise, generated during the trip by turbulence at the side mirrors.

A known approach to solving the aforementioned problems lies in the use of cameras, which can be embedded, for example, in the vehicle body. The viewing angle around the vehicle can be significantly increased, for example, with several cameras behind and on the side of the body. Then the image shot with the cameras is displayed on a monitor in the interior of the motor vehicle.

However, the above solution has the drawback that the displayed image is very close to the viewer. In contrast to looking into the conventional rearview or side mirror, looking at the monitor requires that the eyes continuously readapt, a feature that fatigues the driver of the motor vehicle. When the driver's line of vision is directed alternatingly forward through the windshield or backward through the rearview mirror, the eyes must accommodate and converge. In addition, the image on the monitor does not appear vertical in relation to the visual axis, since for space reasons it can hardly be attached in such a manner in the motor vehicle.

Another significant drawback of such systems is the intrinsic brightness of the monitor over a wide solid angle. Thus, the interior of the motor vehicle is significantly brightened in the dark; and the driver's view in the direction of the outside is rendered significantly difficult.

Therefore, the object of the present invention is to provide an imaging system for motor vehicles, which enables a display with high image quality and offers a higher degree of ergonomics and safety in traffic. Furthermore, a method for displaying images in motor vehicles shall be disclosed. Such a method enables the motor vehicle driver to view images with high quality during the trip without diverting his attention or tiring him due to continuous readaptation of the eyes.

The inventive imaging system for motor vehicles comprises a holographic screen, which scatters incident narrow band light of one or more wavelengths at a predetermined solid angle, a projector to project images on the holographic screen, and a holographic, transparent ray uniter, which allows broad band ambient light to pass in essence unimpeded and which guides the narrow band light, coming from the holographic screen, to the viewer to produce a virtual image at the viewing location.

The invention combines the advantages of conventional rearview mirrors, such as high image quality and no necessity of readaptation at rapidly changing distances, with the advantages of camera systems. On the one hand, a high degree of ergonomics and image quality are achieved; and, on the other hand, safety and economic efficiency while driving are increased.

A camera system can be coupled to the imaging system of the invention. Said camera is focused on the rear and/or the side and thus delivers images from the outside of the motor vehicle to enable a view to the rear and/or to the side. From the driver's viewpoint the ray uniter is mounted advantageously in front of and/or directly on the windshield of the motor vehicle. Preferably the ray uniter is designed as a holographic mirror or as a ray deflector with lens function. The projector can comprise lasers with the primary colors red, green and blue.

Preferably the projector has an image modulator, for example in the form of ferroelectric liquid modulators or micro mirror devices.

The ray uniter can be mounted on a transparent plate, which is made, for example, of glass or plastic. In particular, the holographic ray uniter is arranged in such a manner together with the holographic screen that the virtual image appears for the viewer enlarged behind the windshield, preferably at a distance of at least 1.5 meters, especially preferred at a distance of at least 3 meters.

Furthermore, there can be a device for coupling the imaging to vehicle control functions or preset driving situations. The ray uniter and/or the holographic screen is/are designed and/or arranged preferably in such a manner that the light cone coming from the ray uniter is limited to the possible dwelling space of the viewer's eyes. Preferably the holographic screen and the ray uniter are designed and/or arranged in such a manner that they exhibit an imaging function.

The inventive method for displaying images in motor vehicles includes projecting images on a holographic screen and guiding the light rays, coming from the holographic screen, into a viewer's eyes, whereby virtual images are produced in a surface cutout of the front window and/or windshield by means of a hologram, whose purpose is ray deflection and which is connected in series to the holographic screen. Thus, the ergonomics of driving motor vehicles is increased; and images of the outside can be offered with high quality to the motor vehicle driver, whereby the aforementioned drawbacks of rearview or side mirrors and monitors are overcome.

With this method the images can be taken with a camera system in order to enable, in the windshield, the view in the rearward direction and/or to the side. Preferably images of the view toward the rear and/or from the perspective of the vehicle side mirrors are faded into the peripheral area of the windshield. Preferably the angular distance between the visual axis of the vehicle driver in the direction of travel and the virtual image is less than 30 degrees, especially preferred approximately 10 degrees. Furthermore, the rear and side images from the motor vehicle can be displayed as a function of the driving states or the vehicle control functions.

BRIEF DESCRIPTION OF THE DRAWINGS

The invention is described as an illustrative example with reference to the figures, where.

DETAILED DESCRIPTION OF THE PREFERRED EMBODIMENTS

Figure 1:
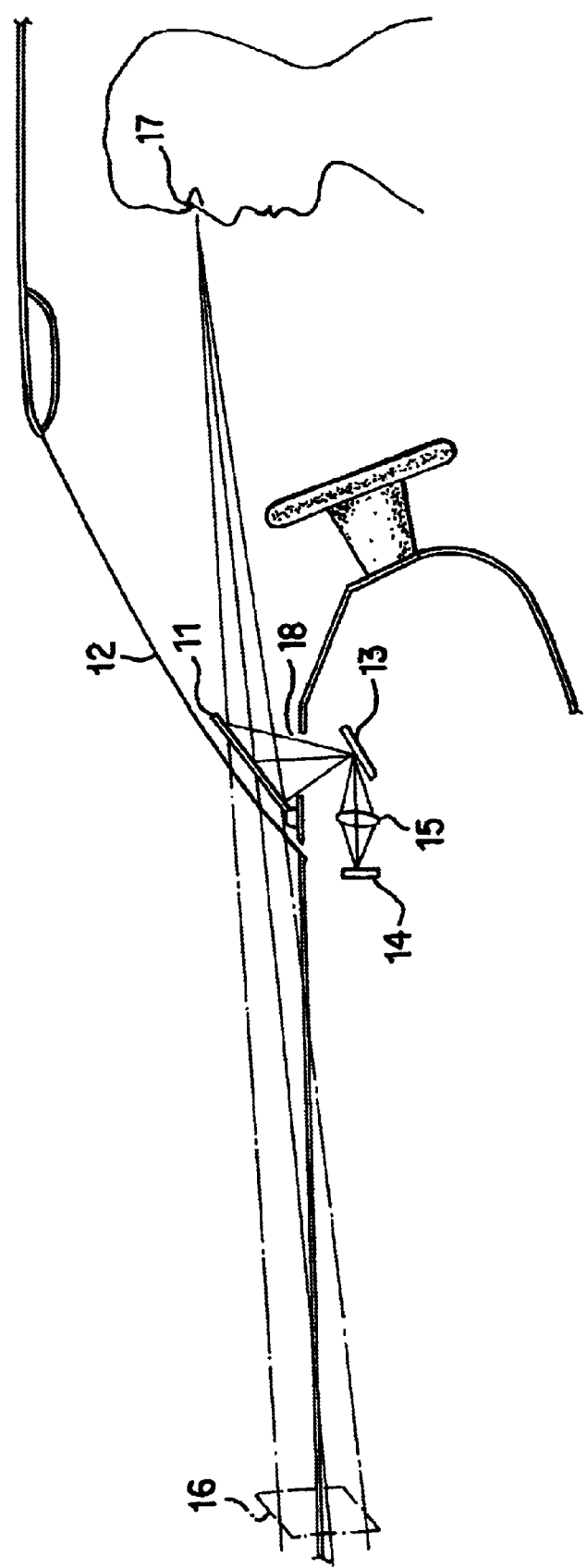
FIG. 1 is a longitudinal view of the motor vehicle with the inventive imaging system and the beam trajectory.

FIG. 1 is a side view or a sectional view of the central plane of the driver of a motor vehicle to depict as a schematic the imaging system and the beam trajectory, according to a preferred embodiment of the invention. In the motor vehicle there is a holographic screen 13, which is produced by means of a holographic shot of a real screen. By means of an image modulator 14 and a lens 15 light is projected on the holographic screen 13 to display images. In this manner images, produced by a light source and the image modulator 14, are imaged as real through the lens 15 on the holographic screen 13. A holographic, transparent ray uniter 11 or combiner is arranged in such a manner that it deflects or almost completely reflects the light rays, issuing from the holographic screen 13 as a consequence of the image projection, in the direction of the viewer 17. The holographic, transparent ray uniter 11 comprises a hologram with the imaging properties of a concave mirror or a lens so that, when viewing the ray uniter 11, a virtual image 16 is produced at the viewing location of the driver 17.

The ray uniter 11 is arranged, as seen from the viewer 17, in front of the windshield 12 of the motor vehicle. Owing to its design as a transparent hologram, it allows the broad band light, coming from the outside through the windshield 12, to pass through virtually unimpeded so that the driver can look out through the ray uniter 11. However, the hologram of the ray uniter 11 is designed in such a manner that narrow band or monochromatic light, for example laser light in the primary colors red, green and blue, which comes from the holographic screen 13, is reflected almost completely in the direction of the driver.

In the embodiment, depicted here, the projector, comprising modulator 14 and lens 15, and the holographic screen 13 are arranged inside the dashboard of the motor vehicle. Through an opening, which is adapted to the opening angle 18 of the ray trajectory between the holographic screen 13 and the ray uniter 11, the light rays pass through the ray uniter 11 to the viewer 17.

In the embodiment, depicted here, the ray uniter 11 is designed as a holographic mirror. It can be mounted either directly on the windshield 12 or on a separate transparent plate, which is disposed in front of the windshield 12. As an alternative, it is also possible that the ray uniter 11 is designed in transmission, whereby it exhibits a lens function, which causes a suitable deflection of the light rays.

Photopolymer, photoresist, silver halide and dichromated gelatin holograms can be used, for example, as holographic materials or holograms for the holographic screen 13 and the ray uniter 12. The holographic screen 13 and the ray uniter 12 can be designed to work in reflection or also in transmission.

The holographic screen 13 and its production are detailed in the German Patent DE 197 00 162 A1 document, to which explicit reference is made. In production, a real, for example white, screen is imprinted into a hologram with the projected laser wavelengths that are used later. During the shooting process, the screen is illuminated in such a manner with the lens ray that its backscatter characteristic is the same as desired later in application. An expanded pencil of rays, which issues from a corresponding location, like the subsequent projecting ray, serves as the reference ray during holographic shooting of the screen. For example, a scanning projecting ray can be used for reproduction. By means of image modulators 14 and use of projected wavelengths in the primary colors red, green and blue, a real image can be produced on the hologram or the holographic screen. Other possibilities and details of the production are disclosed in the aforementioned document.

Primarily red, green and blue crystal lasers, glass fiber lasers and diode lasers are used as the source of illumination for the full color imaging at the image modulators 14. The power range of the lasers used is in an order of magnitude of a few milliwatts.

Suitable full color image modulators are, for example, ferroelectric liquid modulators or micro mirror devices or micro mirror modulators. In this respect different imaging standards, such as VGR, XGR, SXGR, PAL, etc., can be used.

The ray uniter 11 and the holographic screen 13 are synchronized in such a manner that the virtual image 16 appears at a certain distance in front of the windshield 12. Thus, there is no need for the alternating accommodation of the eyes for near and far vision that is otherwise necessary with monitors. In the embodiment, depicted here, the ray uniter 11 is disposed in front of the windshield 12 at its lower edge so that the virtual image 16 for the viewer or the car driver 17 lies in the lane 16 or in the visible front parts of the motor vehicle body, such as the hood of the engine. Therefore, the view ahead in the direction of travel is not impaired; and the angular distance between the viewing axis ahead in the direction of travel and the projected image is extremely small. In normal motor vehicles of the conventional type, this view can be set, for example, to 10 degrees. Even an angular distance of up to 30 degrees means a significant improvement compared to the view in the conventional motor vehicle mirrors or monitors.

Figure 2:
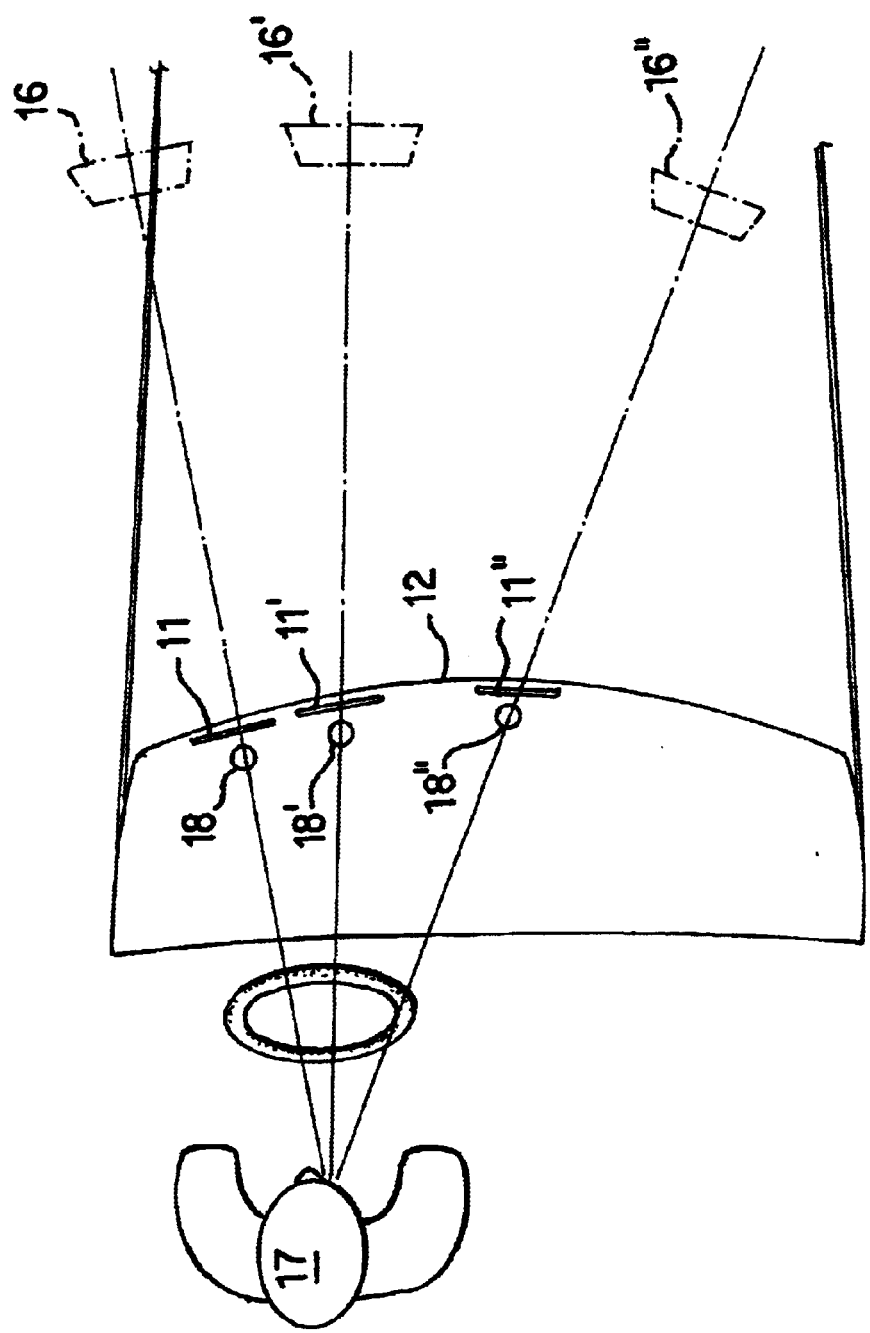
FIG. 2 is a sectional view from the top with different ray paths in a car, according to a specific embodiment of the invention.

FIG. 2 depicts another embodiment of the invention, wherein several images, which are shot by separate camera systems, appear as virtual images 16, 16', 16" in the windshield or front window 12 of the motor vehicle. In this case three projectors with related holographic screens are disposed in the dashboard or behind the dashboard cover. At the windshield 12 there are the ray uniters 11, 11', 11", which lie side by side and are intended to produce the virtual images 16, 16', 16", which are, as seen from the viewer 17, behind the respective ray uniter. The cameras, projectors, holographic screens and ray uniters are arranged in such a manner that the driver 17 of the motor vehicle sees, when looking straight ahead to the front, the ray uniter 11' with the rear image 16', whereas he can see the left rear image 16 or the right rear image 16' through the respective left and right ray uniters 11, 11". Thus, for example, images, as they appear in conventionally arranged rearview and side view mirrors, can be offered in the windshield 12 as virtual images, which are at a viewing location at some distance behind the windshield 12.

Suitable cameras for shooting outside images are, for example, CCD and CMOS cameras, which cover a wide range of brightness. For example, the glare effect while driving at night can be avoided with highly dynamic CMOS cameras. It is also possible to install additionally residual light amplifying cameras and un-cooled infrared cameras to improve vision at night. In addition to the significant enlargement of the viewing angle around the car, which is the result of arranging several cameras behind and on the side of the body, a panoramic view around the motor vehicle can be rendered possible with a suitable arrangement of a plurality of cameras.

Suitable light sources for the projection of images on the holographic screen are, besides lasers, also other monochromatic light sources, such as light emitting diodes. Color imaging is made possible through projection with the primary colors red, green and blue. The virtual images 16, 16', 16" that are produced are projected with sufficient brightness into the windshield 12, where they beam over the image of the environment lying behind it. However, with suitable adjustment of the brightness both images, that is the virtual image 16, 16', 16" and the transparent real image, can also be viewed simultaneously. Since the holographic ray uniter 11 is transparent, the broad band ambient light is allowed to pass virtually unimpeded; and the view through the windshield 12 is completely unimpeded, when the additional image or the virtual image 16, 16', 16" is turned off.

Since the driver's spatial perception of the distance and the situation of other vehicles or the course of the street is based essentially on a comparison of size and the perspective perception, and less on the stereoscopic vision, a monoscopic imaging is usually adequate. Therefore, to simplify the construction, one can omit the technically difficult stereoscopic imaging in the holographic projection without any significant loss of information.

In the described arrangement the driver can see the virtual image or the auxiliary image 16, 16', 16" in the bottom area of the windshield 12. In this outer field, which otherwise remains unused for the driver, the virtual rear or side image is imaged and appears, therefore, for the viewer in the street or the engine hood of the motor vehicle.

However, it is also possible to have the image appear on a separate transparent plate, mounted in front of the windshield 12. In this case the virtual image appears through the surface of the dashboard.

In another special embodiment, the fading of the rear and/or side images into the windshield or the vehicle pane 12 is not constantly present, but rather coupled to specific driving states or controls of the motor vehicle. For example, there can be a device, which offers the driver 17 images corresponding to reversing or actuating the blink lights.

The hologram of the ray uniter 12 is designed in such a manner and focused with respect to the holographic screen 13 so that the light cone, issuing from the ray uniter 12 in the direction of the driver, is defined by the possible dwelling space of the driver's eyes. The quantity of projected light can be controlled as a function of the light ratio, for example during the day or night. Owing to the limitation of the light cone and the adjusted quantity of light there is no disturbing brightening of the vehicle interior during the night.

The inventive imaging with intercalation of a screen hologram and combining of imaging functions for virtual images with the ray uniter 11 enable optimal use of the quantity of light for the relatively wide range of motion of the motor vehicle driver 17. Narrow band sources of light, like lasers or light emitting diodes, enable full color imaging in a simple and economical construction.

In summary the invention makes it possible to fade virtual images directly into the driver's field of vision without disturbing the view ahead.

What is claimed is:

1. An imaging system for motor vehicles, comprising:
   a projector,
   a holographic ray uniter, which guides narrow band light to a viewer to produce a virtual image at the viewing location,
   a holographic screen, which is produced by means of holographic shooting of a real screen and which scatters incident narrow band light of one or more wavelengths at a predetermined solid angle,
   wherein the projector projects the light onto the holographic screen to produce real images on said holographic screen, wherein the holographic ray uniter is transparent to broad band ambient light, and wherein the narrow band light, scattered by the holographic screen, is guided to the viewer.

2. The imaging system, as claimed in claim 1, wherein a camera system, which is coupled to the projector, shoots images outside the motor vehicle to enable a view to at least one of the rear and the side.

3. The imaging system, as claimed in claim 1, wherein the holographic ray uniter is arranged, from the viewer's view, at least one of, in front of and on, the windshield of the motor vehicle.

4. The imaging system, as claimed in claim 1, wherein the ray uniter is a holographic mirror.

5. The imaging system, as claimed in claim 1, wherein the ray uniter is a ray deflector with lens function.

6. The imaging system, as claimed in claim 1, wherein the projector comprises lasers with the primary colors red, green and blue.

7. The imaging system, as claimed in claim 1, wherein the projector comprises an image modulator.

8. The imaging system as claimed in claim 7, wherein the image modulator is at least one of ferroelectric modulators and micro-mirror devices.

9. The imaging system, as claimed in claim 1, wherein the ray uniter is disposed on a transparent plate.

10. The imaging system, as claimed in claim 1, wherein the holographic ray uniter and the holographic screen are arranged in such a manner that the virtual image appears for the viewer enlarged behind the windshield of the motor vehicle at a distance of at least 1.5 meters to the viewer.

11. The imaging system according to claim 10, wherein the distance is at least 3 meters.

12. The imaging system, as claimed in claim 1, further comprising a device for coupling the imaging to the motor vehicle control functions.

13. The imaging system, as claimed in claim 1, wherein at least one of the ray uniter and the holographic screen is designed and arranged in such a manner that the light cone coming from the ray uniter is limited to the possible dwelling space of the viewer's eyes.

14. The imaging system, as claimed in claim 1, wherein at least one of the ray uniter and the holographic screen is designed and arranged in such a manner that they exhibit an imaging function.

15. A method for displaying images in motor vehicles comprising the steps of:

projecting images by means of a laser and an image modulator for producing a narrow band light on a holographic screen;

guiding the light rays, scattered from the holographic screen, into a viewer's eyes, producing virtual images in a surface located in front of the windshield of the motor vehicle by means of a hologram connected in series to the holographic screen to provide ray deflection.

16. The method as claimed in claim 15, wherein images of the a view from at least one of the rear and the perspective of the motor vehicle side mirrors are faded into the peripheral area of the windshield.

17. The method as claimed in claim 15, wherein an angular distance between a visual axis in a direction of travel and the virtual image is less than 30 degrees.

18. The method according to claim 17, wherein the angular distance is substantially 10 degrees.

19. The method as claimed in claim 15, wherein at least one of the rear and side images from the motor vehicle are displayed as a function of a driving state or the motor vehicle control functions.

20. A method for displaying images in motor vehicles comprising the steps of:

projecting narrow band light of one or more wavelengths on a holographic screen, which is produced by holographic shooting of a real screen, to produce a real image on the holographic screen, and guiding the light rays, scattered by the holographic screen at a predetermined solid angle, into a viewer's eye, whereby the light rays are deflected through a hologram and produce a virtual image at the viewer, while simultaneously broad band light of the environment lying behind the hologram passes through the hologram.

21. The method as claimed in claim 20, wherein images of the view from at least one of the rear and the perspective of the motor vehicle side mirrors are faded into the peripheral area of the windshield.

22. The method as claimed in claim 20, wherein the angular distance between the visual axis in the direction of travel and the virtual image is less than 30 degrees.

* * * * *